(12) United States Patent
Okamura

(10) Patent No.: US 9,335,957 B2
(45) Date of Patent: May 10, 2016

(54) COMMUNICATION APPARATUS AND METHOD FOR CONTROLLING THE SAME, AND STORAGE MEDIUM

(71) Applicant: CANON KABUSHIKI KAISHA, Tokyo (JP)

(72) Inventor: Shintaro Okamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 14/271,893

(22) Filed: May 7, 2014

(65) Prior Publication Data

US 2014/0340701 A1    Nov. 20, 2014

(30) Foreign Application Priority Data

May 14, 2013    (JP) .................................. 2013-102595

(51) Int. Cl.
*G06F 3/12*    (2006.01)
*H04N 1/00*    (2006.01)
(52) U.S. Cl.
CPC .............. *G06F 3/121* (2013.01); *G06F 3/1234* (2013.01); *G06F 3/1292* (2013.01); *H04N 1/0035* (2013.01)

(58) Field of Classification Search
CPC ...... G06F 3/1234; G06F 3/1292; G06F 3/121
See application file for complete search history.

(56) References Cited

FOREIGN PATENT DOCUMENTS

JP    2011-060046 A    3/2011

*Primary Examiner* — Mohammad Ghayour
*Assistant Examiner* — Lennin Rodriguezgonzalez
(74) *Attorney, Agent, or Firm* — Fitzpatrick, Cella, Harper & Scinto

(57) ABSTRACT

A technology is provided for, when an error occurs in a communication apparatus (image forming apparatus), notifying a user of information relating to the error using NFC without a decrease in the user's convenience. A communication apparatus according to an aspect of the present invention includes an NFC device (NFC controller) which can operate in either a reader/writer mode or a card emulation mode. The communication apparatus, when an error occurs, obtains information relating to the error, and sets, into the NFC device, the obtained error information as information which an external mobile terminal can read from the communication apparatus via NFC in the card emulation mode. The communication apparatus also sets the operation mode of the NFC device to the card emulation mode.

12 Claims, 13 Drawing Sheets

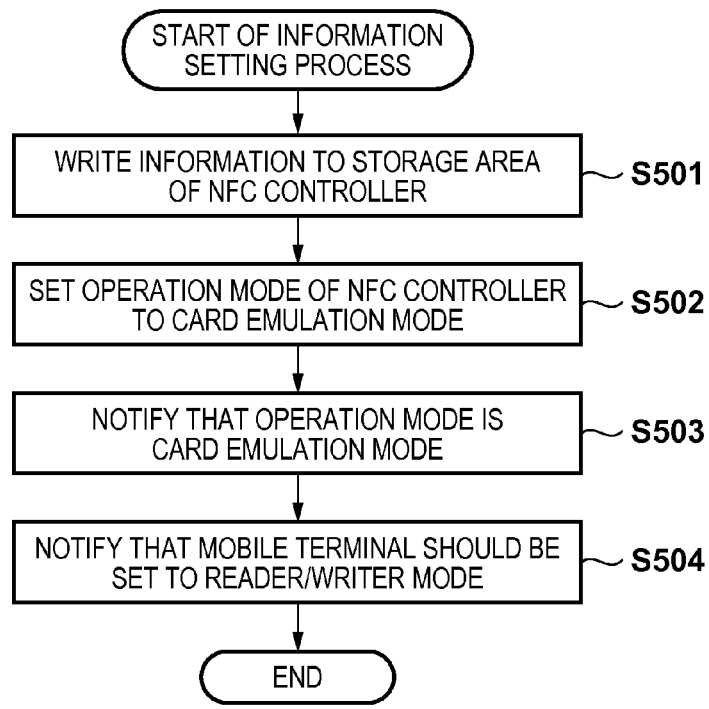
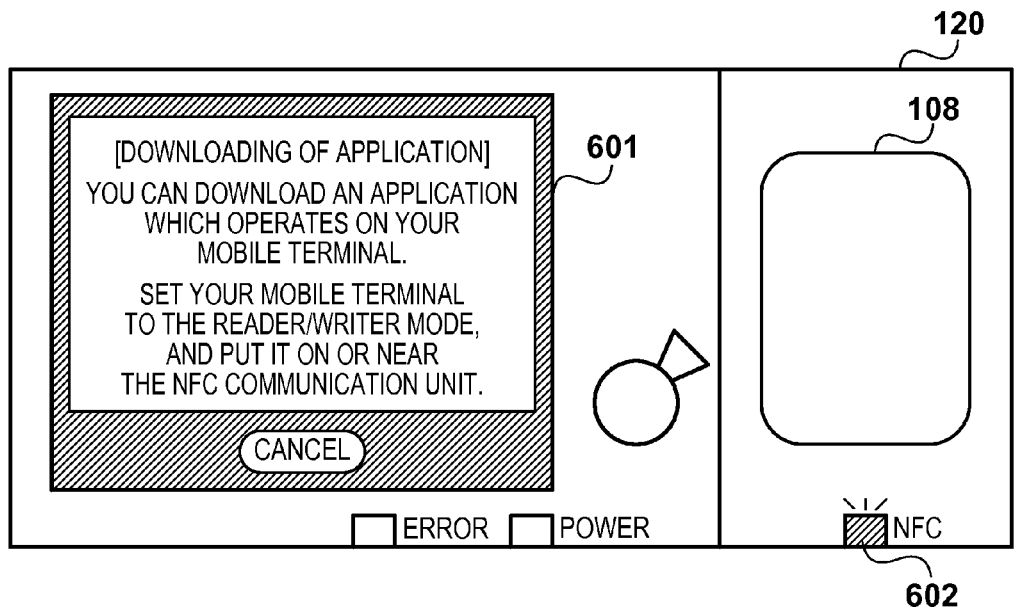

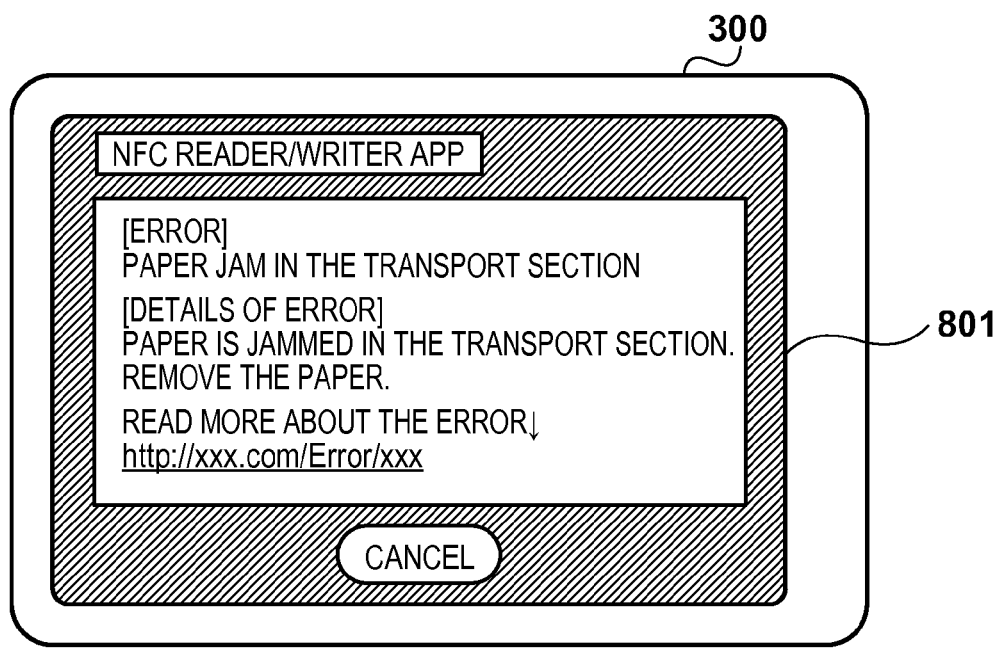
F I G. 11

COMMUNICATION APPARATUS AND METHOD FOR CONTROLLING THE SAME, AND STORAGE MEDIUM

BACKGROUND OF THE INVENTION

1. Field of the Invention

The present invention relates to communication apparatuses and methods for controlling the same, and storage media.

2. Description of the Related Art

Image forming apparatuses are typically provided with an authentication function for control of whether or not to permit a user to use the apparatus. Some of such authentication functions have in recent years utilized a radio-frequency identification (RFID) tag. For example, in the case of an image forming apparatus equipped with a reader/writer for reading information from an RFID tag, when a user puts an RFID tag on or near the reader/writer, information in the RFID tag is read by the reader/writer, whereby an authentication function using RFID can be performed.

Also, in recent years, Near Field Communication (NFC), which is a short-range wireless communication technique compatible with RFID, has started to be implemented in mobile terminals, such as a smartphone, a tablet computer, etc. The NFC standards define three functions which are a reader/writer function, a card emulation function, and an inter device communication (peer-to-peer (P2P)) function. The reader/writer function is a function of reading and writing data from and to an NFC-compliant device, and is similar to the above-described reader/writer of RFID. The card emulation function is a function similar to the above-described operation of an RFID tag. The peer-to-peer function is a function of exchanging data between NFC-compliant devices. A mobile terminal having the NFC functions has a reader/writer implemented therein, which allows the mobile terminal to read and write data from and to an RFID card or an NFC card. It is not necessary to previously supply power to RFID cards, because, when the RFID card communicates with a reader/writer, power is supplied from the reader/writer to the RFID card via radio waves to allow the RFID card to operate.

On the other hand, if an image forming apparatus has the NFC functions, the image forming apparatus can not only perform an authentication function using the reader/writer function as described above, but also communicate with a mobile terminal having the NFC functions using the card emulation function. As a result, the mobile terminal can display information about the image forming apparatus, such as information about consumables (e.g., the amount of paper remaining on a paper feed tray) in the image forming apparatus, information about the state of a print job processed in the image forming apparatus, etc. With such a display technique, for example, even when an image forming apparatus is equipped with a small display unit or is not equipped with any display unit, information about the image forming apparatus can be displayed using a mobile terminal having a larger display unit. In addition, for example, when an error occurs in an image forming apparatus, the details of the error and instructions for troubleshooting the error can be displayed on the display unit of a mobile terminal to prompt the user to troubleshoot the error.

Thus, in an image forming apparatus having the NFC functions, the reader/writer function is used when an authentication function is performed, and the card emulation function is used when information is provided to a mobile terminal. Therefore, the image forming apparatus needs to switch the operation mode between a reader/writer mode in which the reader/writer function is used and a card emulation mode in which the card emulation function is used, depending on the situation in which the image forming apparatus operates.

For example, Japanese Patent Laid-Open No. 2011-60046 proposes a technique of switching the communication mode of an NFC device between an operation mode in which the NFC device functions as a reader/writer and an operation mode in which the NFC device functions as an active tag, depending on the operation state of an information processing apparatus including the NFC device. Specifically, the NFC device is caused to operate in the active tag mode when the operation state of the information processing apparatus is the powered-off or power-saving state, and in the reader/writer mode when the operation state of the information processing apparatus is the normal power state. Thus, the operation state of the information processing apparatus in the above patent document corresponds to the state of power consumption by the information processing apparatus.

However, in the conventional technique of the above patent document, the operation mode of the NFC device is switched, depending only on the state of power consumption by the information processing apparatus, irrespective of whether or not an error occurs. If such a technique is applied to an image forming apparatus, then even when an error occurs in the image forming apparatus, the operation mode of the NFC device is not automatically switched. For example, when the NFC device is operating in the reader/writer mode while the image forming apparatus is in the normal operation state, then even if an error occurs in the image forming apparatus, information about the error cannot be displayed on a mobile terminal via NFC. In this case, it is necessary to switch the operation mode of the NFC device to the card emulation mode by the user's operation. In addition, when the NFC device is operating in the card emulation mode while the image forming apparatus is in the power-saving state, authentication information cannot be read from an NFC card, thus, authentication cannot be performed via NFC. Therefore, it is necessary to appropriately switch the operation mode of the NFC device without decreasing the user's convenience even if an error occurs in the image forming apparatus.

SUMMARY OF THE INVENTION

With the above problems in mind, the present invention has been made. The present invention provides a technique of, when an error occurs in a communication apparatus (image forming apparatus), notifying the user of information relating to the error, using NFC, without decreasing the user's convenience.

According to one aspect of the present invention, there is provided a communication apparatus that can communicate with an external apparatus via short-range wireless communication, the communication apparatus comprising: a communication unit configured to, when the communication apparatus is in a normal operation state in which an error does not occur therein, operate in either a first mode in which the communication apparatus can read and write information from and to an external apparatus located within a communication coverage, via the short-range wireless communication, or a second mode in which the external apparatus can read and write information from and to the communication apparatus via the short-range wireless communication; an obtaining unit configured to, when an error occurs in the communication apparatus, obtain information relating to the error; a setting unit configured to set, into the communication unit, the obtained information as information which the external apparatus can read from the communication apparatus via the short-range wireless communication in the second mode; and a control unit configured to, when the error occurs in the communication apparatus, set an operation mode of the communication unit to the second mode so that the external apparatus can read the information relating to the error.

According to another aspect of the present invention, there is provided a method for controlling a communication apparatus that can communicate with an external apparatus via short-range wireless communication, the method comprising: causing, when the communication apparatus is in a normal operation state in which an error does not occur therein, a communication unit of the communication apparatus to operate in either a first mode in which the communication apparatus can read and write information from and to an external apparatus located within a communication coverage, via the short-range wireless communication, or a second mode in which the external apparatus can read and write information from and to the communication apparatus via the short-range wireless communication; obtaining, when an error occurs in the communication apparatus, information relating to the error; setting, into the communication unit, the obtained information as information which the external apparatus can read from the communication apparatus via the short-range wireless communication in the second mode; and setting, when the error occurs in the communication apparatus, an operation mode of the communication unit to the second mode so that the external apparatus can read the information relating to the error.

According to still another aspect of the present invention, there is provided a computer-readable storage medium storing a computer program for causing a computer to execute steps of a method for controlling a communication apparatus that can communicate with an external apparatus via short-range wireless communication, the method comprising: causing, when the communication apparatus is in a normal operation state in which an error does not occur therein, a communication unit of the communication apparatus to operate in either a first mode in which the communication apparatus can read and write information from and to an external apparatus located within a communication coverage, via the short-range wireless communication, or a second mode in which the external apparatus can read and write information from and to the communication apparatus via the short-range wireless communication; obtaining, when an error occurs in the communication apparatus, information relating to the error; setting, into the communication unit, the obtained information as information which the external apparatus can read from the communication apparatus via the short-range wireless communication in the second mode; and setting, when the error occurs in the communication apparatus, an operation mode of the communication unit to the second mode so that the external apparatus can read the information relating to the error.

According to the present invention, when an error occurs in a communication apparatus (image forming apparatus), the user can be notified of information relating to the error, using NFC, without decreasing the user's convenience.

Further features of the present invention will become apparent from the following description of exemplary embodiments (with reference to the attached drawings).

BRIEF DESCRIPTION OF THE DRAWINGS

FIG. 5 is a flowchart showing steps of a process which is performed by an image forming apparatus 100 to set information into an NFC controller 107.

FIG. 6 is a diagram showing an example display on an operation unit 120 when an image forming apparatus 100 sets information into an NFC controller 107.

FIG. 11 is a diagram showing an example display on an operation unit 304 when a mobile terminal reads information from an image forming apparatus 100, according to the first embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Firstly, a first embodiment of the present invention will be described with reference to FIGS. 1 to 11. Note that FIGS. 1 to 8B and description thereof are common to the first to fourth embodiments.

<System Configuration>

Figure 1:
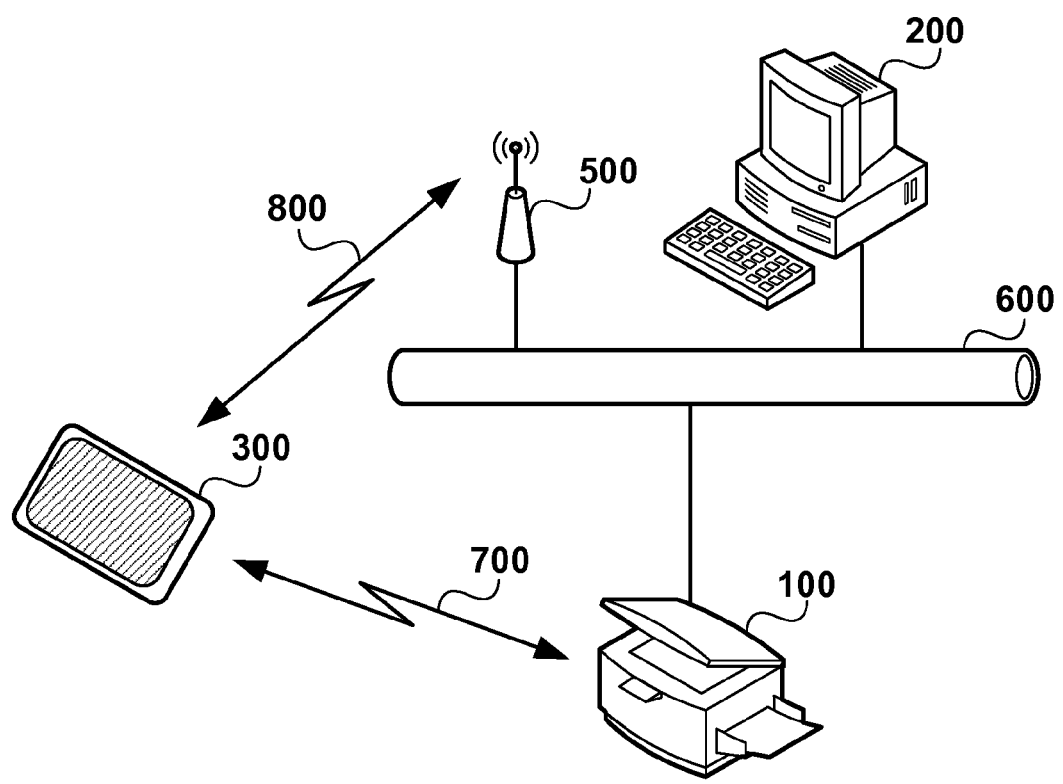
FIG. 1 is a diagram showing an overall configuration of a system.

FIG. 1 is a diagram showing an overall configuration of a system according to this embodiment. The system includes an image forming apparatus 100, a personal computer (PC) 200, a mobile terminal 300, a wireless LAN access point 500, and a local area network (LAN) 600. Note that the system may include any number of PCs, mobile terminals, image forming apparatuses, etc.

The image forming apparatus 100 has a copy function, a print function, and a scan function. The image forming apparatus 100 also has an authentication function for authenticating a user who uses these functions. In order to authenticate a user, an authentication card (not shown) which stores the user's ID information is used. The image forming apparatus 100 receives a user's ID information stored in an authentication card via NFC communication 700, and performs user authentication based on an authentication database (not shown) held in the image forming apparatus 100. Note that, instead of holding the authentication database in the image forming apparatus 100, for example, a server which performs an authentication process may be provided on the LAN 600, and may be allowed to perform the authentication process via the LAN 600.

The PC 200 can transmit a print job to the image forming apparatus 100 and reference data computerized by the image forming apparatus 100.

The mobile terminal 300 is a portable information processing terminal which has an NFC communication function, a wireless LAN communication function, etc., such as a smartphone or a tablet computer. The mobile terminal 300 can communicate with the image forming apparatus 100 via the NFC communication 700. For example, the mobile terminal 300 transmits and receives information, such as IP address information, user ID information, etc., to and from the image forming apparatus 100 via the NFC communication 700. The mobile terminal 300 also includes a wireless LAN interface (I/F). Therefore, the mobile terminal 300 can transmit image data held in the mobile terminal 300 to the image forming apparatus 100 via wireless LAN communication 800 to allow the image forming apparatus 100 to perform a print process based on the image data.

The wireless LAN access point 500 can communicate with an apparatus having a wireless LAN I/F, such as the mobile terminal 300 etc., and is connected to the LAN 600. The mobile terminal 300 can communicate with an apparatus connected to the LAN 600, via the wireless LAN access point 500. Although, in this embodiment, a system configuration employing a wireless LAN is illustrated, another system configuration may be used which is compliant with other wireless communication standards, such as Bluetooth etc., instead of a wireless LAN.

The LAN 600 is a network compliant with communication standards, such as Ethernet etc. In this embodiment, the image forming apparatus 100, the PC 200, and the wireless LAN access point 500 are connected to one another via the LAN 600.

Note that, in this embodiment, the image forming apparatus 100 is an example communication apparatus which can communicate with an external apparatus via short-range wireless communication, and the mobile terminal 300 is an example external apparatus.

<Configuration of Image Forming Apparatus>

Figure 2A:
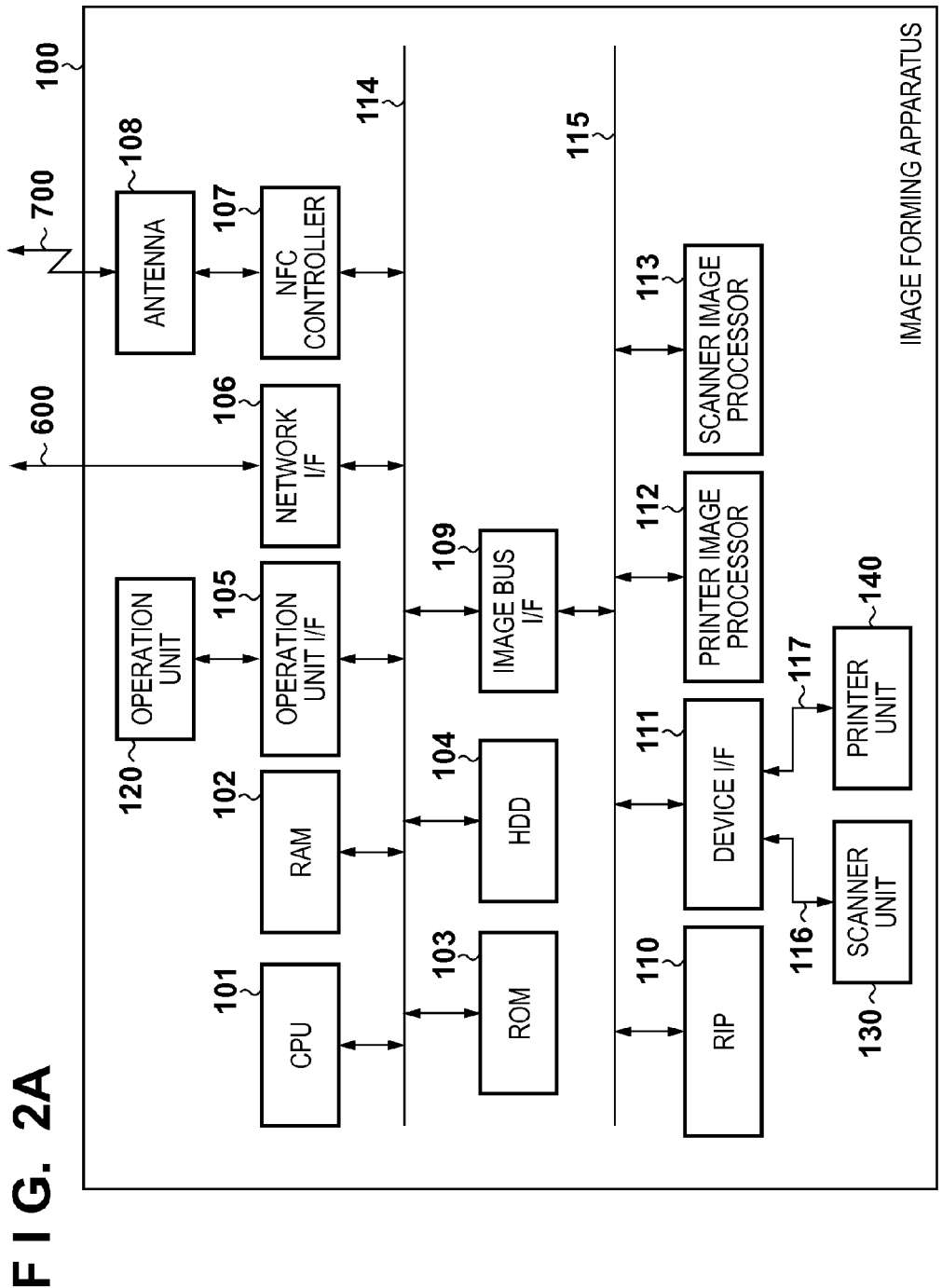
FIG. 2A is a block diagram showing a configuration of an image forming apparatus 100.

FIG. 2A is a block diagram showing a configuration of the image forming apparatus 100 of this embodiment. The image forming apparatus 100 includes a CPU 101, a RAM 102, a ROM 103, an HDD 104, an operation unit I/F 105, a network I/F 106, an NFC controller 107, and an image bus I/F 109, which are connected to one another by a system bus 114. The image forming apparatus 100 also includes an operation unit 120 connected to the operation unit I/F 105, and an antenna 108 connected to the NFC controller 107. The image forming apparatus 100 also includes an RIP 110, a device I/F 111, a printer image processor 112, and a scanner image processor 113 as functional blocks which perform image processing, which are connected to one another by an image bus 115.

The CPU 101 controls the entire image forming apparatus 100. The RAM 102 is a volatile memory which is used as a work memory for temporarily storing data used in calculation by the CPU 101. The ROM 103 stores a program which is used to start up the image forming apparatus 100, and is mainly used when the image forming apparatus 100 is started up. The hard disk drive (HDD) 104 is a non-volatile storage device which stores software involved in a control of the image forming apparatus 100, and various items of data, such as various items of setting data, stored document data, etc.

The operation unit 120, which includes a liquid crystal display (LCD) and a touchscreen, functions as an input I/F for inputting information to the image forming apparatus 100 according to the user's operation, and an output I/F for outputting information, with respect to the user of the image forming apparatus 100. The operation unit I/F 105 is an I/F for the operation unit 120 which relays data which is exchanged between the operation unit 120 and the system bus 114.

The network I/F 106 is an I/F for exchanging data with an external apparatus via the LAN 600. The NFC controller 107 performs a control to perform the NFC communication 700 via the antenna 108. The antenna 108 is an antenna for performing the NFC communication 700, which transmits and receives electric waves to and from an external apparatus for the NFC communication 700.

The image bus I/F 109 is connected between the system bus 114 and the image bus 115 to relay data between the system bus 114 and the image bus 115 and convert the data structure of relayed data. The raster image processor (RIP) 110 converts a page description language (PDL) code, a display list, etc. into a bitmap image. The device I/F 111 is an I/F which connects a scanner unit 130 and a printer unit 140 with the image bus 115.

The device I/F 111 performs timing adjustment for transmitting image data received from the scanner unit 130 to the image bus 115, and timing adjustment for transmitting image data from the image bus 115 to the printer unit 140. The scanner unit 130 generates image data using a scanner sensor, and performs on the generated image data a process, such as correction, resolution conversion, etc., depending on the image forming apparatus 100. The printer unit 140 forms an image on a sheet (recording medium) based on image data input via the device I/F 111. The printer unit 140 also performs a process, such as correction, resolution conversion, etc., depending on a print engine of the image forming apparatus 100, on image data which is to be output and printed.

(NFC Controller 107)

Figure 2B:
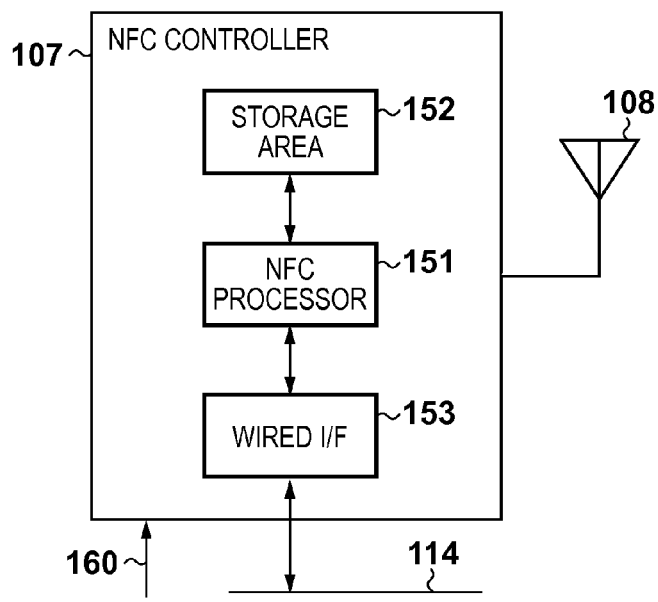
FIG. 2B is a block diagram showing a configuration of an NFC controller 107.

FIG. 2B is a block diagram showing a configuration of the NFC controller 107. The NFC controller 107 includes an NFC processor 151, and a non-volatile storage area 152 and a wired I/F 153 which are connected to the NFC processor 151. The wired I/F 153 is connected to the system bus 114. The NFC controller 107 can receive power supply 160 from a power source in the image forming apparatus 100 etc. via a wire.

The NFC processor 151 is a communication processor involved in NFC which includes a CPU (not shown) and a RAM (not shown) which is a work memory for the CPU. The storage area 152 stores information which can be read from a reader/writer during operation in the card emulation mode. The NFC processor 151 stores information which can be read from a reader/writer into the storage area 152. The wired I/F 153 is an I/F for allowing data (information) to be exchanged between the NFC processor 151 and devices connected to the system bus 114. The CPU 101 can transmit and receive information to and from the NFC processor 151 via the wired I/F 153 to write and read information to and from the storage area 152.

The NFC controller 107 can be supplied with power which is received as electric waves by the antenna 108 to operate during short-range wireless communication with an external reader/writer. Note that an NFC controller 307 of the mobile terminal 300 can access data in the storage area 152 using power supplied, by the power supply 160, from the power source in the image forming apparatus 100 etc. via a wire, in addition to power supplied from the antenna 108. Specifically, even after the image forming apparatus 100 has been powered off, the mobile terminal 300 can read information from the storage area 152 via the NFC communication 700.

In this embodiment, when an error does not occur in the image forming apparatus 100 (normal operation state), the NFC controller 107 operates in an operation mode which is either a reader/writer mode (first mode) or a card emulation mode (second mode). Here, the reader/writer mode is an operation mode in which the image forming apparatus 100 can read and write information from and to an external apparatus (the mobile terminal 300) located within a communication coverage via NFC, which is short-range wireless communication. The card emulation mode is an operation mode in which an external apparatus (the mobile terminal 300) located within a communication coverage can read and write information from and to the image forming apparatus 100 via NFC. Note that, in this embodiment, the NFC controller 107 is an example communication unit.

<Configuration of Mobile Terminal>

Figure 3:
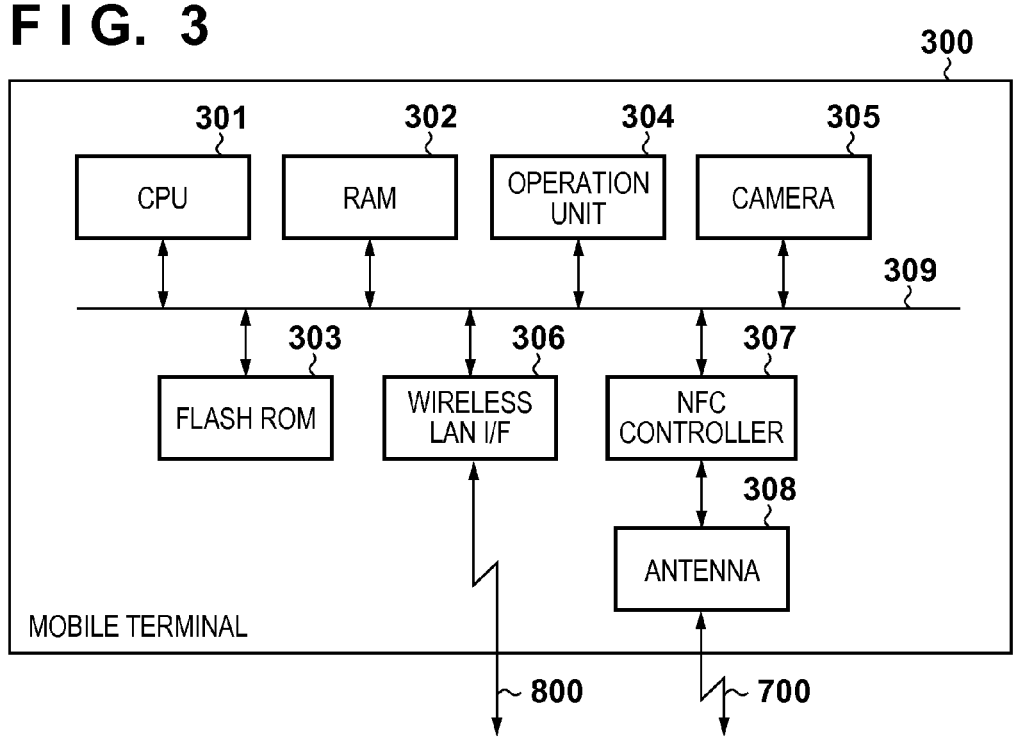
FIG. 3 is a block diagram showing a configuration of a mobile terminal 300.

FIG. 3 is a block diagram showing a configuration of the mobile terminal 300 of this embodiment. The mobile terminal 300 includes a CPU 301, a RAM 302, a flash ROM 303, an operation unit 304, a camera 305, a wireless LAN I/F 306, and an NFC controller 307, which are connected to one another by a system bus 309. These devices may exchange data with each other via the system bus 309. Note that the NFC controller 307 of the mobile terminal 300 has a function similar to that of the NFC controller 107 of the image forming apparatus 100.

The CPU 301 controls the entire mobile terminal 300. The RAM 302 is a volatile memory which is used as a work memory for temporarily storing data which is used in calculation by the CPU 301. The flash ROM 303 is a rewritable non-volatile memory which stores a program and various items of data used by the CPU 301. The operation unit 304, which includes a liquid crystal display (LCD) and a touchscreen, functions as an input I/F for inputting information to the image forming apparatus 100 according to the user's operation, and an output I/F for outputting information, with respect to the user of the mobile terminal 300.

The camera 305 captures a still image or a moving image. The wireless LAN I/F 306 is an I/F for exchanging data with an external apparatus via the wireless LAN communication 800. The NFC controller 307 controls the NFC communication 700. An antenna 308 is an antenna for performing the NFC communication 700, which transmits and receives electric waves to and from an external apparatus for the NFC communication 700.

<Example Short-Range Wireless Communication>

Figure 4A:
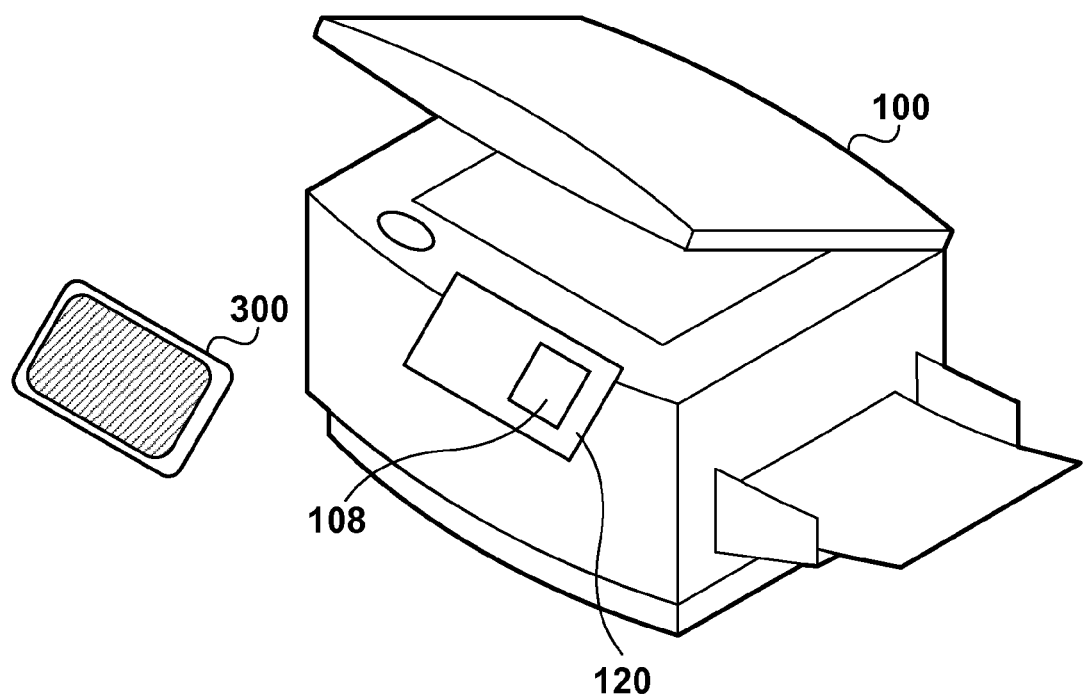
FIGS. 4A and 4B are diagrams showing an example state in which a mobile terminal 300 is located far away from an image forming apparatus 100 and an example state in which a mobile terminal 300 is located on or near an image forming apparatus 100, respectively.
Figure 4B:
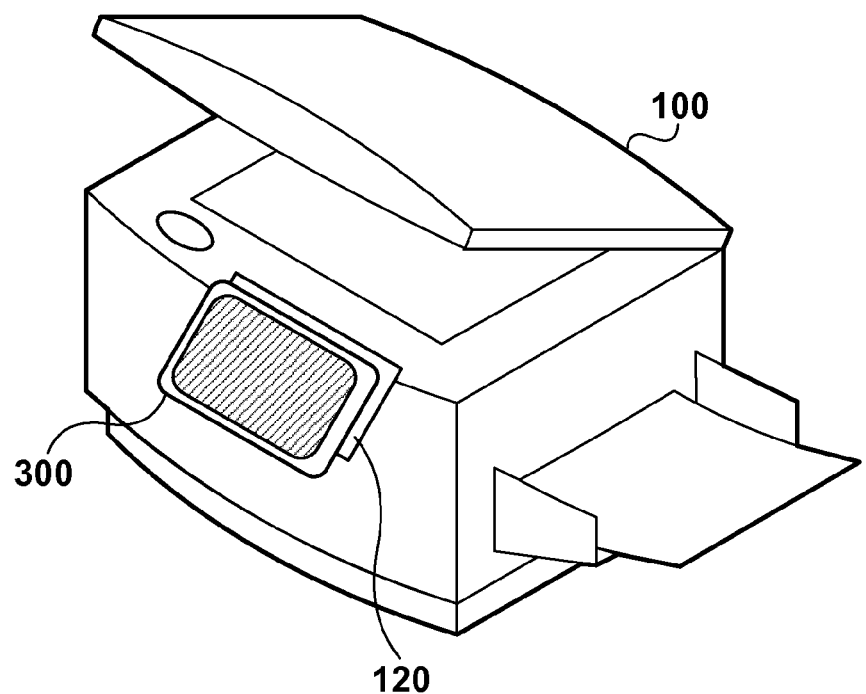

FIGS. 4A and 4B are diagrams showing an example state in which the mobile terminal 300 is located far away from the image forming apparatus 100 and an example state in which the mobile terminal 300 is located on or near the image forming apparatus 100, respectively. Here, as an example, the NFC controller 107 of the image forming apparatus 100 is operating in the card emulation mode, and the NFC controller 307 of the mobile terminal 300 is operating in the reader/writer mode.

FIG. 4A shows a state in which the mobile terminal 300 is located far away from the image forming apparatus 100. In the state of FIG. 4A, the NFC controller 307 of the mobile terminal 300 is located out of the range within which the NFC controller 307 of the mobile terminal 300 can perform short-range wireless communication with the NFC controller 107 of the image forming apparatus 100. In this state, the mobile terminal 300 cannot read or write information from or to the storage area 152 of the NFC controller 107 via short-range wireless communication.

FIG. 4B shows a state in which the mobile terminal 300 is located on or near the image forming apparatus 100. In the state of FIG. 4B, the NFC controller 307 of the mobile terminal 300 is located within the range within which the NFC controller 307 of the mobile terminal 300 can perform short-range wireless communication with the NFC controller 107 of the image forming apparatus 100. In this state, the mobile terminal 300 can read and write information from and to the storage area 152 of the NFC controller 107 via short-range wireless communication.

By performing such short-range wireless communication, the mobile terminal 300 can read, from the storage area 152, information about the image forming apparatus 100, such as a download link of an application which can be operated in the mobile terminal 300, etc. The mobile terminal 300 can use an application downloaded using the read download link to transmit, for example, image data in the mobile terminal 300 to the image forming apparatus 100 via the wireless LAN communication 800. As a result, the mobile terminal 300 can cause the image forming apparatus 100 to print the image data.

<Operation (Normal Operation State) of Image Forming Apparatus>

Next, the NFC communication 700 which is performed between the image forming apparatus 100 and the mobile terminal 300 when the image forming apparatus 100 is in the normal operation state will be described with reference to FIGS. 5 to 8B. Note that the normal operation state means that an error does not occur in the image forming apparatus 100. In this embodiment, it is assumed that, in the normal operation state, the operation mode of the NFC controller 107 has been set to the reader/writer mode. This is for allowing the image forming apparatus 100 to perform the authentication function. In this case, if the operation mode of the NFC controller 307 of the mobile terminal 300 is set to the card emulation mode, the image forming apparatus 100 can obtain the user's authentication information from the mobile terminal 300 via NFC, and perform the authentication process. Note that, in the normal operation state, the operation mode of the NFC controller 107 may be set to the card emulation mode etc.

(Information Setting Process)

FIG. 5 is a flowchart showing steps of a process which is performed by the image forming apparatus 100 to set information into the NFC controller 107 according to this embodiment. Note that an example in which the above application download link is set into the NFC controller 107 will now be described. The process of FIG. 5 is achieved in the image forming apparatus 100 by the CPU 101 reading a program stored in the ROM 103 to the RAM 102 and executing the program.

FIG. 6 is a diagram showing an example display screen displayed on the operation unit 120 when the information setting process of FIG. 5 is performed in the image forming apparatus 100. The operation unit 120 includes a display unit 601 and an NFC notification LED 602. The display unit 601 displays a message, an operation menu, etc. sent from the image forming apparatus 100. The NFC notification LED 602 is caused to be on when the operation mode of the NFC controller 107 is the card emulation mode. The "on" state of the NFC notification LED 602 notifies the user that the operation mode of the NFC controller 107 has been set to the card emulation mode. The antenna 108 is provided on the operation unit 120. When the user puts the antenna 308 of the mobile terminal 300 on or near the antenna 108, NFC communication can be established between the NFC controller 107 and the NFC controller 307.

The process of FIG. 5 is started by the user operating the operation unit 120 and thereby inputting a selection instruction to set a download link into the NFC controller 107. After the start of the process, in step S501 the CPU 101 writes download link information stored in the HDD 104 to the storage area 152 of the NFC controller 107 via the wired I/F 153. Next, in step S502, the CPU 101 switches the operation mode of the NFC controller 107 from the reader/writer mode to the card emulation mode, thereby setting the operation mode to the card emulation mode. Note that the CPU 101 sets the operation mode of the NFC controller 107 by setting for a register (not shown) included in the NFC controller 107.

After the operation mode of the NFC controller 107 has been switched to the card emulation mode, in step S503 the CPU 101 turns on the NFC notification LED 602 to notify the user that the NFC controller 107 is operating in the card emulation mode. In step S504, the CPU 101 causes the display unit 601 to display a message which prompts the user to set the operation mode of the mobile terminal 300 to the reader/writer mode, and thereafter, ends the information setting process.

(Information Reading Process)

Figure 7:
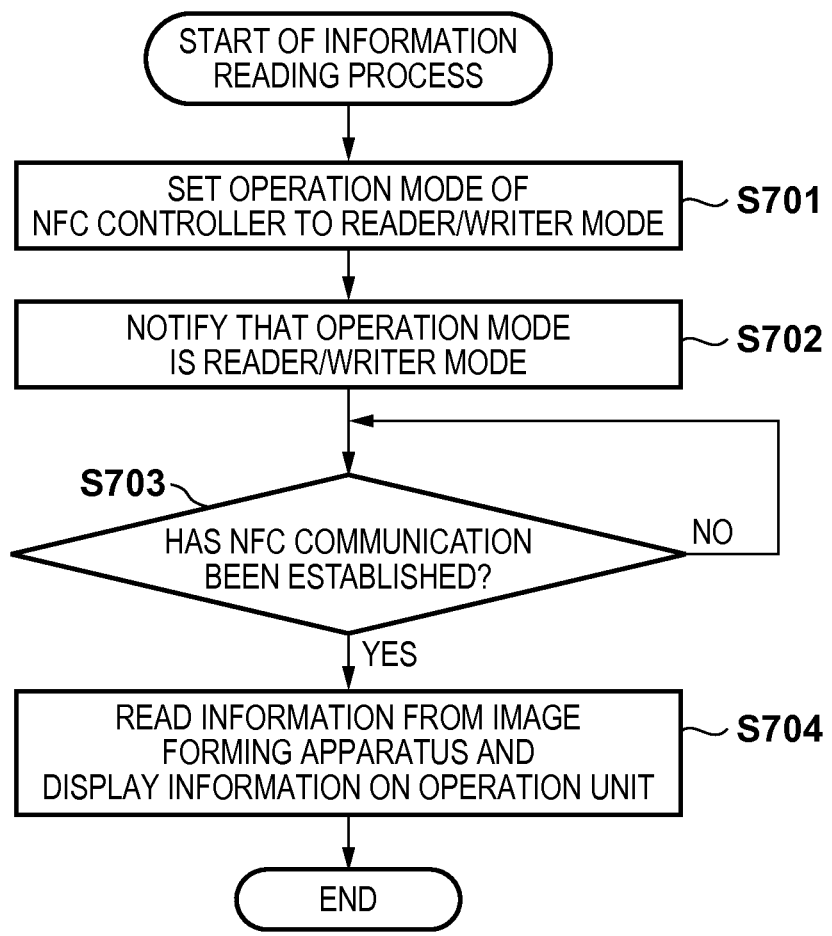
FIG. 7 is a flowchart showing steps of a process which is performed by a mobile terminal 300 to read information from an NFC controller 107 of an image forming apparatus 100.
Figure 8A:
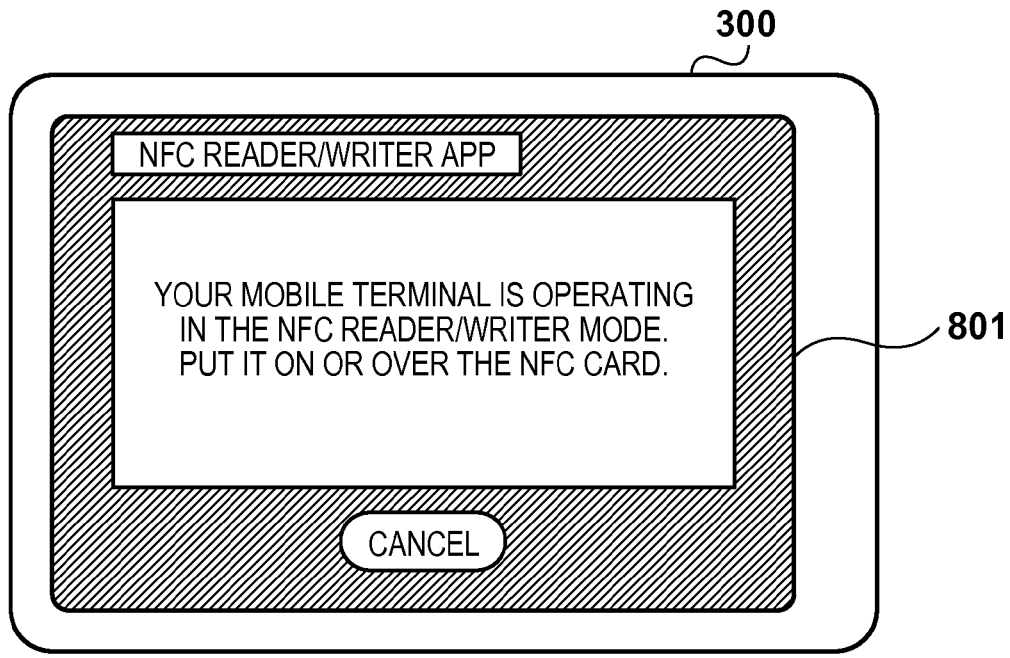
FIGS. 8A and 8B are diagrams showing example displays on an operation unit 304 when a mobile terminal 300 reads information from an image forming apparatus 100 via NFC communication.
Figure 8B:
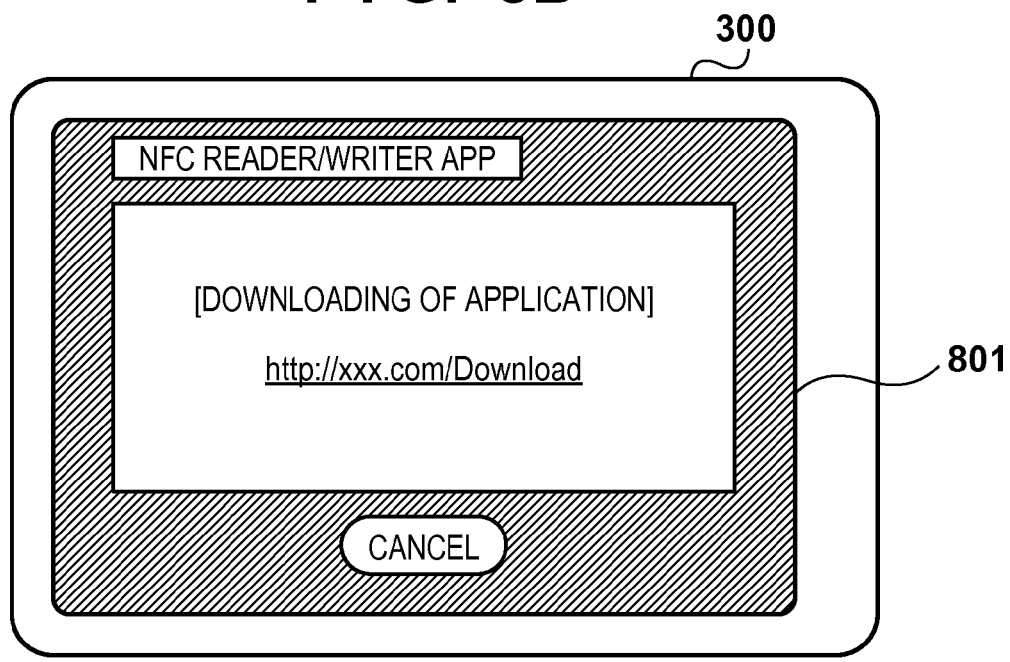

FIG. 7 is a flowchart showing steps of a process which is performed by the mobile terminal 300 to read information from the NFC controller 107 of the image forming apparatus 100 according to this embodiment. FIGS. 8A and 8B show example messages which are displayed on a display unit provided in the operation unit 304 of the mobile terminal 300 when the information reading process of FIG. 7 is performed in the mobile terminal 300. An example in which the mobile terminal 300 reads the above application download link will now be described. Note that the process of FIG. 7 is started by the user instructing the mobile terminal 300 to execute a preinstalled application which causes the mobile terminal 300 to operate as a reader/writer in NFC communication. The CPU 301 of the mobile terminal 300 executes the application, whereby the process of FIG. 7 is achieved in the mobile terminal 300. Such an application is not limited to a single application, and may be a plurality of applications. Alternatively, a portion of the application may be replaced with the user's operation, whereby a similar process may be achieved.

In step S701, the CPU 301 sets the operation mode of the NFC controller 307 to the reader/writer mode. Next, in step S702, as shown in FIG. 8A, the CPU 301 causes a display unit 801 to display a message indicating that the NFC controller 307 is operating in the reader/writer mode.

When the user who has read the message displayed on the display unit 801 puts the mobile terminal 300 (the antenna 308) on or near the antenna 108 of the image forming apparatus 100, the CPU 301 tries to connect to the image forming apparatus 100 via the NFC communication 700. In step S703, the CPU 301 tries to establish the NFC communication 700, and determines whether or not connection via the NFC communication 700 has been established. The CPU 301 can confirm the establishment of connection via the NFC communication 700 by checking a register (not shown) which is included in the NFC controller 307 and indicates the state of the NFC controller 307. The CPU 301, when determining that connection via the NFC communication 700 has not been established ("NO" in step S703), waits until the NFC communication 700 has been established. On the other hand, the CPU 301, when determining that connection via the NFC communication 700 has been established ("YES" in step S703), causes the process to proceed to step S704.

When the NFC communication 700 has been established, the NFC controller 307 reads information (download link information) from the storage area 152 of the NFC controller 107. In step S704, as shown in FIG. 8B, the CPU 301 causes the display unit 801 to display an application download link read from the storage area 152, and ends the information reading process.

In the above information setting process and information reading process, an example has been described in which the mobile terminal 300 reads a download link of an application which is to be operated in the mobile terminal 300, from the image forming apparatus 100, via the NFC communication 700. However, information read from the image forming apparatus 100 is not limited to that information, and may be various items of information. For example, the mobile terminal 300 may be allowed to read from the image forming apparatus 100 various items of information, such as an IP address of the image forming apparatus 100, the amount of a remaining consumable (a toner cartridge, paper, etc.), the state of processing of a print job, counter information about the number of copies, a web link to a product manual, etc. Instead of a single item of information, the mobile terminal 300 may read a plurality of items of information at once from the image forming apparatus 100 via the NFC communication 700. Instead of selection by the user's operation, predetermined information may be previously stored in the storage area 152, and the mobile terminal 300 may be allowed to read the information from the image forming apparatus 100.

Although, in the above example, the image forming apparatus 100 includes the display unit 601, the image forming apparatus 100 may not include a display unit. In such a case, the user may, for example, be notified using only an LED instead of a message on the display unit.

<Operation of Image Forming Apparatus (when Error Occurs)>

Next, an operation of the image forming apparatus 100 which is performed when an error occurs in the image forming apparatus 100 will be described with reference to FIGS. 9 to 10B.

Figure 9:
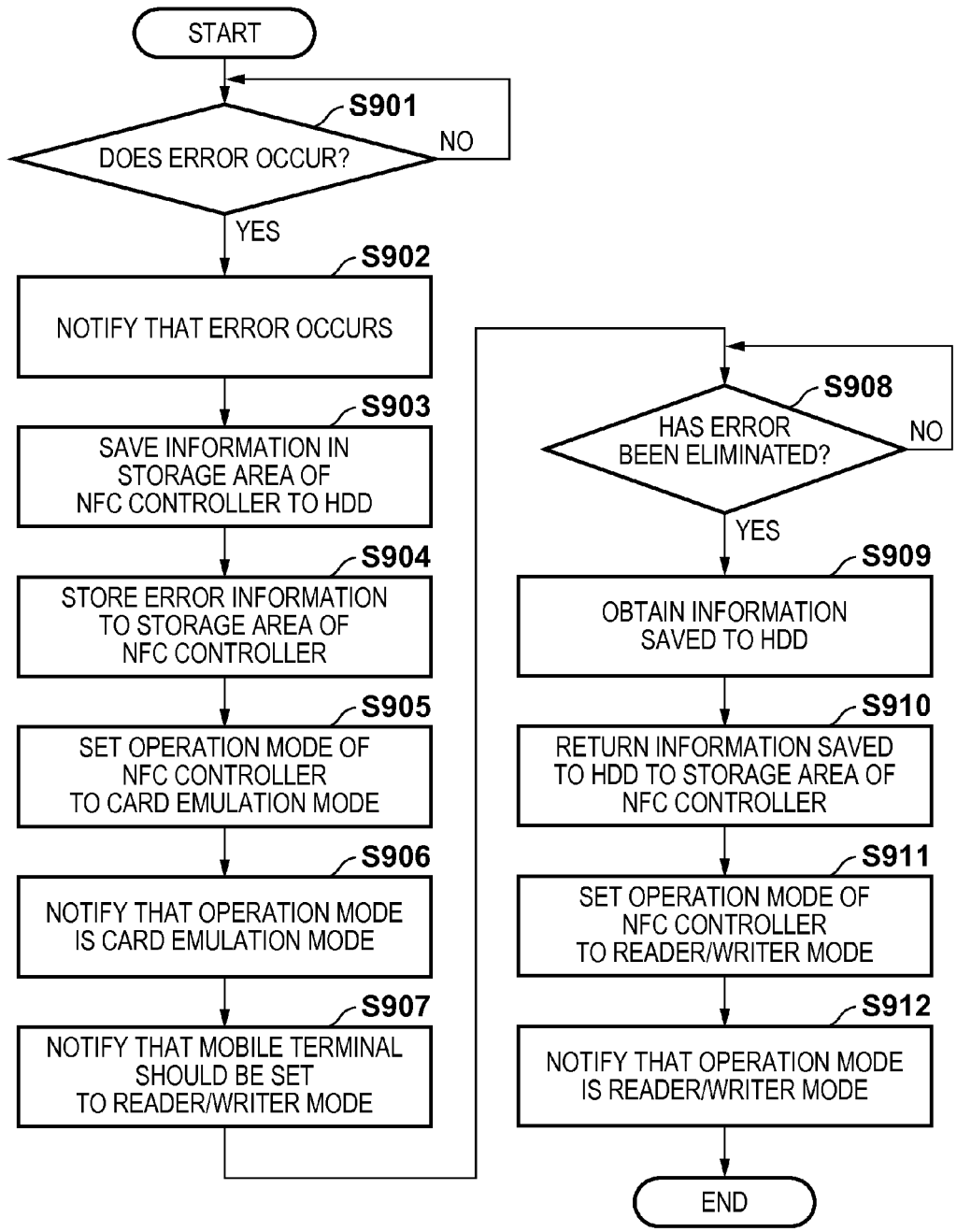
FIG. 9 is a flowchart showing steps of a process which is performed by an image forming apparatus 100 when an error occurs in the image forming apparatus, according to a first embodiment.
Figure 10A:
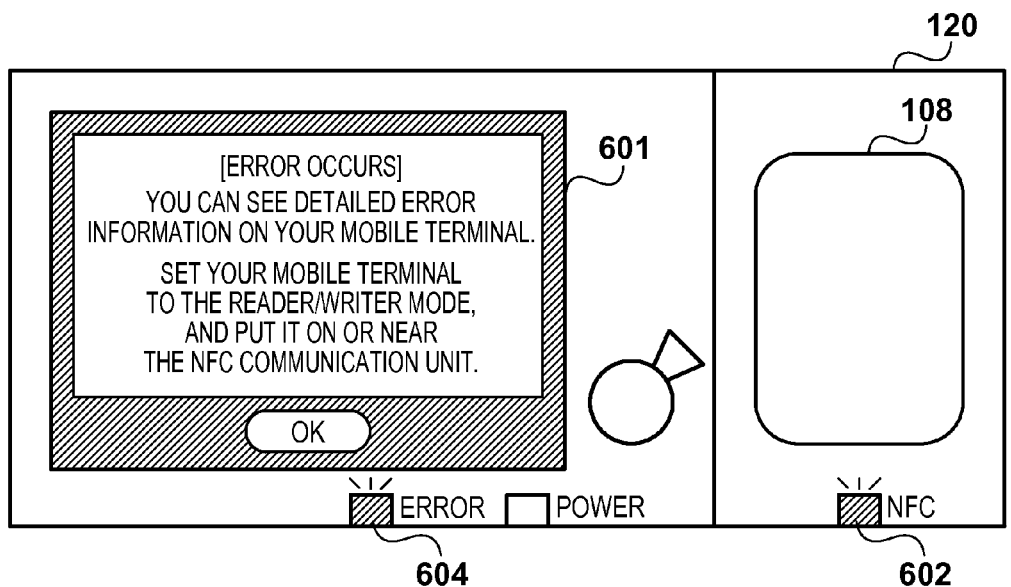
FIGS. 10A and 10B are diagrams showing example displays on an operation unit 120 when an NFC controller 107 of an image forming apparatus 100 is set, according to the first embodiment.
Figure 10B:
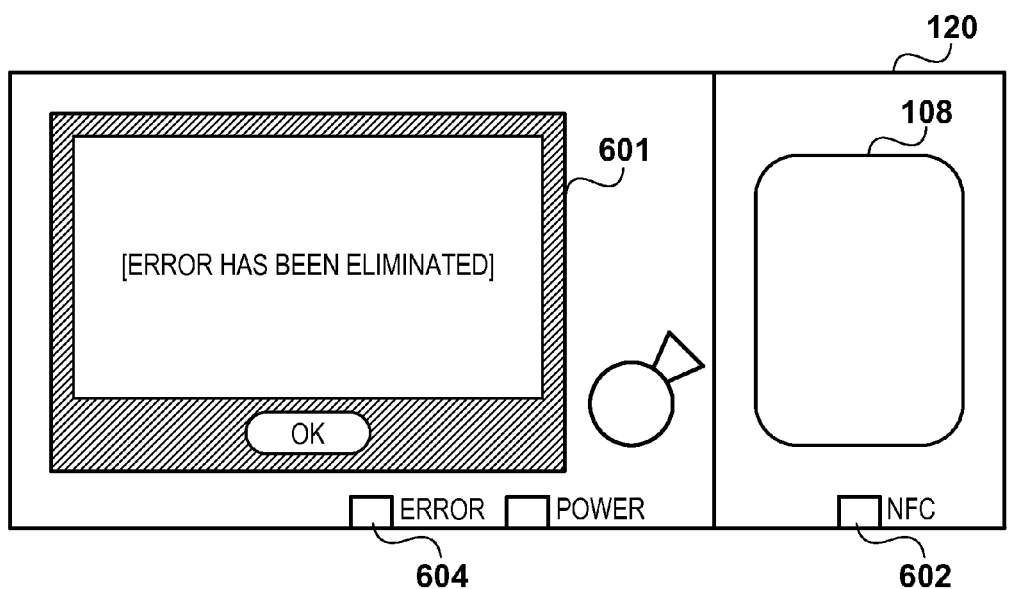

FIG. 9 is a flowchart showing steps of a process which is performed by the image forming apparatus 100 according to this embodiment when an error occurs in the image forming apparatus 100. FIGS. 10A and 10B are diagrams showing example display screens which are displayed on the operation unit 120 when the process of FIG. 9 is performed in the image forming apparatus 100. Note that the process of FIG. 9 is achieved in the image forming apparatus 100 by the CPU 101 reading a program stored in the ROM 103 to the RAM 102 and executing the program.

When the image forming apparatus 100 is in the normal operation state, in step S901 the CPU 101 monitors the status of the image forming apparatus 100 to determine whether or not an error occurs. The CPU 101, when determining that an error does not occur ("NO" in step S901), monitors the status of the image forming apparatus 100 by repeating the determination process. In this case, the image forming apparatus 100 is in the normal operation state, and a copy function, a print function, etc. can be used. On the other hand, the CPU 101, when determining that an error occurs ("YES" in step S901), causes the process to proceed to step S902. In step S902, as shown in FIG. 10A, the CPU 101 turns on an error notification LED 604 of the operation unit 120, and causes the display unit 601 to display a message indicating that an error occurs. As a result, the CPU 101 notifies the user that an error occurs in the image forming apparatus 100.

Next, in step S903, the CPU 101 temporarily moves (saves) information stored in the storage area 152 of the NFC controller 107 to the HDD 104 in order to prevent the information from being overwritten. Thereafter, in step S904, the CPU 101 obtains error information which is information relating to the error which has been detected in step S901, and writes (stores) the error information to the storage area 152 of the NFC controller 107. Thus, the CPU 101 sets into the NFC controller 107 the obtained error information as information which can be read by the mobile terminal 300 from the image forming apparatus 100 via NFC in the card emulation mode.

Next, in step S905, the CPU 101 sets the operation mode of the NFC controller 107 to the card emulation mode. Thus, the CPU 101 sets the operation mode of the NFC controller 107 to the card emulation mode so that the mobile terminal 300 can read error information when an error occurs in the image forming apparatus 100. Note that, in this embodiment, the NFC controller 107 has been set to the reader/writer mode in the normal operation state, and therefore, the CPU 101 switches the operation mode from the reader/writer mode to the card emulation mode. Note that when the NFC controller 107 has been set to the card emulation mode in the normal operation state, it is not necessary to change the setting of the operation mode.

After step S905, in step S906 the CPU 101 turns on the NFC notification LED 602 of the operation unit 120 to notify the user that the NFC controller 107 of the image forming apparatus 100 is operating in the card emulation mode. In step S907, as shown in FIG. 10A, the CPU 101 causes the display unit 601 to display a message which prompts the user to set the operation mode of the mobile terminal 300 to the reader/writer mode. As a result, the user is notified that the mobile terminal 300 (i.e., the NFC controller 307) should be set to the reader/writer mode.

Here, it is assumed that the user sets the operation mode of the NFC controller 307 of the mobile terminal 300 to the reader/writer mode according to the display of the display unit 601, and puts the antenna 308 of the mobile terminal 300 on or near the antenna 108 of the image forming apparatus 100. In this case, the NFC controller 307 reads information from the storage area 152 of the NFC controller 107 via the NFC communication 700. As a result, the mobile terminal 300 can read the above error information from the image forming apparatus 100. Such a process in the mobile terminal 300 is performed by the information reading process of FIG. 7.

FIG. 11 shows an example display screen which is displayed on the display unit 801 of the mobile terminal 300 in step S704 when the mobile terminal 300 performs the information reading process. As shown in FIG. 11, the display unit 801 displays a web link for obtaining information about details of an error, detailed information of the error, and instructions for troubleshooting the error, as information read from the image forming apparatus 100 via the NFC communication 700. The user can eliminate the error occurring in the image forming apparatus 100 based on the displayed content of the display unit 801.

Thereafter, in step S908, in the image forming apparatus 100, the CPU 101 checks the status of the image forming apparatus 100 which is being monitored, to determine whether or not the error has been eliminated. The CPU 101, when determining that the error has not been eliminated ("NO" in step S908), allows the NFC controller 107 to continue to operate in the card emulation mode. On the other hand, the CPU 101, when determining that the error has been eliminated ("YES" in step S908), causes the process to proceed to step S909.

In step S909, the CPU 101 obtains the information which has been moved (saved) to the HDD in step S903. In step S910, the CPU 101 writes (returns) the obtained information to the storage area 152 of the NFC controller 107. Thereafter, in step S911, the CPU 101 sets the operation mode of the NFC controller 107 to the reader/writer mode. Finally, as shown in FIG. 11B, in step S912, the CPU 101 causes the display unit 601 to display a message indicating that the error occurring in the image forming apparatus 100 has been eliminated, and turns the error notification LED 604 off. As a result, the CPU 101 notifies the user that the error occurring in the image forming apparatus 100 has been eliminated. The CPU 101 also turns the NFC notification LED 602 off, thereby notifying the user that the NFC controller 107 of the image forming apparatus 100 is operating in the reader/writer mode. Thereafter, the CPU 101 ends the process.

In the above process, in steps S903, S909, and S910, when an error occurs in the image forming apparatus 100, information stored in the storage area 152 of the NFC controller 107 is temporarily saved to the HDD 104, and error information is written to the storage area 152. However, information read from the mobile terminal 300 may be stored to the HDD 104 instead of the storage area 152. In this case, each time the NFC communication 700 is performed between the image forming apparatus 100 and the mobile terminal 300, the NFC controller 107 may read information from the HDD 104 and transmit the information to the mobile terminal 300 via the NFC communication 700. As a result, step S903 or steps S909 and S910 can be removed.

As described above, according to this embodiment, even when the image forming apparatus 100 has only a small display unit or no display unit, the mobile terminal 300 having a larger display unit can be used to display error information of the image forming apparatus 100. This is particularly advantageous when the mobile terminal 300 has a large display unit like a tablet computer.

In this embodiment, the NFC controller 107 can receive power supply via the NFC communication 700 with the mobile terminal 300. Therefore, when an error occurs, even if the user turns the image forming apparatus 100 off, the mobile terminal 300 can read error information from the image forming apparatus 100 via NFC.

Second Embodiment

Next, a second embodiment of the present invention will be described with reference to FIG. 12. The second embodiment is different from the first embodiment in a process which is performed by the image forming apparatus 100 when an error occurs in the image forming apparatus 100. Note that, in the description that follows, for the sake of simplicity, parts common to the first and second embodiments will not be described.

In the first embodiment, when an error occurs in the image forming apparatus 100, the operation mode of the NFC controller 107 is set to the card emulation mode. Therefore, until the error has been eliminated, even if the user puts an authentication card (not shown) on or near the antenna 108 of the NFC controller 107, the NFC controller 107 cannot be caused to read authentication information from the authentication card. In other words, the authentication function of the image forming apparatus 100 cannot be used. Therefore, in this embodiment, in order to improve a user's convenience, the authentication function of the image forming apparatus 100 is caused to be usable even when an error occurs in the image forming apparatus 100.

Figure 12:
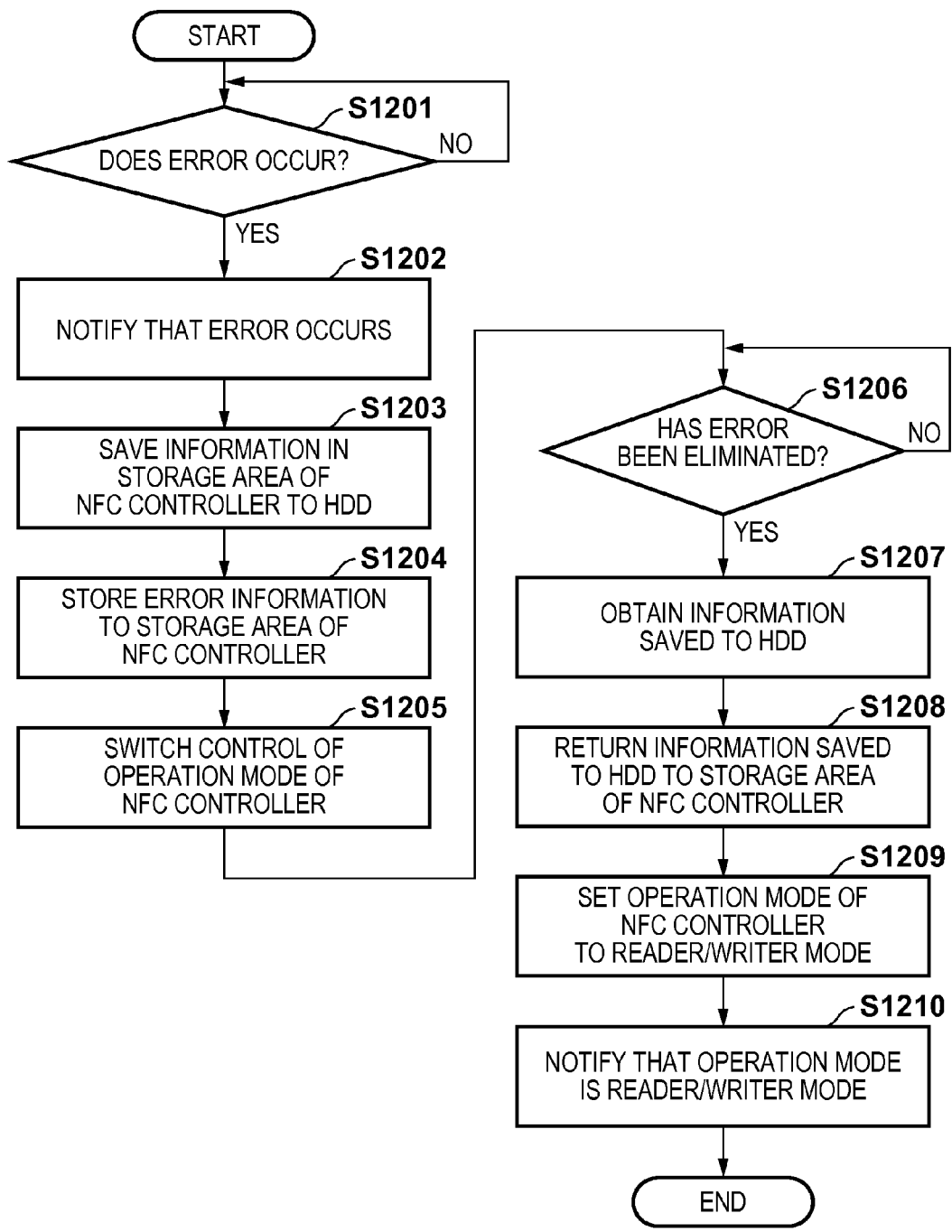
FIG. 12 is a flowchart showing steps of a process which is performed by an image forming apparatus 100 when an error occurs, according to a second embodiment.

FIG. 12 is a flowchart showing steps of a process which is performed by the image forming apparatus 100 according to this embodiment when an error occurs. The process of FIG. 12 is achieved in the image forming apparatus 100 by the CPU 101 reading a program stored in the ROM 103 to the RAM 102 and executing the program. Note that, in FIG. 12, steps S1201 to S1204 and steps S1206 to S1210 are similar to steps S901 to S904 and steps S908 to S912 of FIG. 9 (first embodiment) and therefore will not be described.

In this embodiment, after step S1204, in step S1205, the CPU 101 does not fixedly set the operation mode of the NFC controller 107 to the card emulation mode. In step S1205, the CPU 101 performs an operation mode switch control to operate the NFC controller 107 while alternating the reader/writer mode and the card emulation mode at predetermined time intervals. The CPU 101 continues to perform the switch control after an error occurs in the image forming apparatus 100 and until the error has been eliminated ("YES" in step S1206).

As a result, even when an error occurs in the image forming apparatus 100, then if the user puts an authentication card on or near the NFC controller 107 when the NFC controller 107 is operating in the reader/writer mode, the authentication function of the image forming apparatus 100 can be used. Also, if the user puts the mobile terminal 300 in which the NFC controller 307 is operating in the card emulation mode on or near the NFC controller 107, the mobile terminal 300 can obtain error information set in the NFC controller 107. Moreover, the error information can be displayed on the mobile terminal 300.

Note that the time intervals at which the operation mode is switched in the above switch control may be set to be as short as possible (e.g., 10 msec). As a result, the authentication function can be used and error information can be displayed on the mobile terminal 300 without it being necessary for the user to know the operation mode of the NFC controller 107.

When an error occurring in the image forming apparatus 100 has been eliminated, in step S1209 the CPU 101 stops the operation mode switch control, and sets the operation mode back to the reader/writer mode in which the image forming apparatus 100 had been before the occurrence of the error.

According to this embodiment, when an error occurs in the image forming apparatus 100, both the use of the authentication function using an authentication card and the display of error information of the image forming apparatus 100 on the mobile terminal 300, can be achieved without a decrease in the user's convenience.

Third Embodiment

Next, a third embodiment of the present invention will be described with reference to FIGS. 13 and 14. The third embodiment is different from the first and second embodiments in a process which is performed by the image forming apparatus 100 when an error occurs in the image forming apparatus 100. Note that, in the description that follows, for the sake of simplicity, parts common to the first to third embodiments will not be described.

Figure 13:
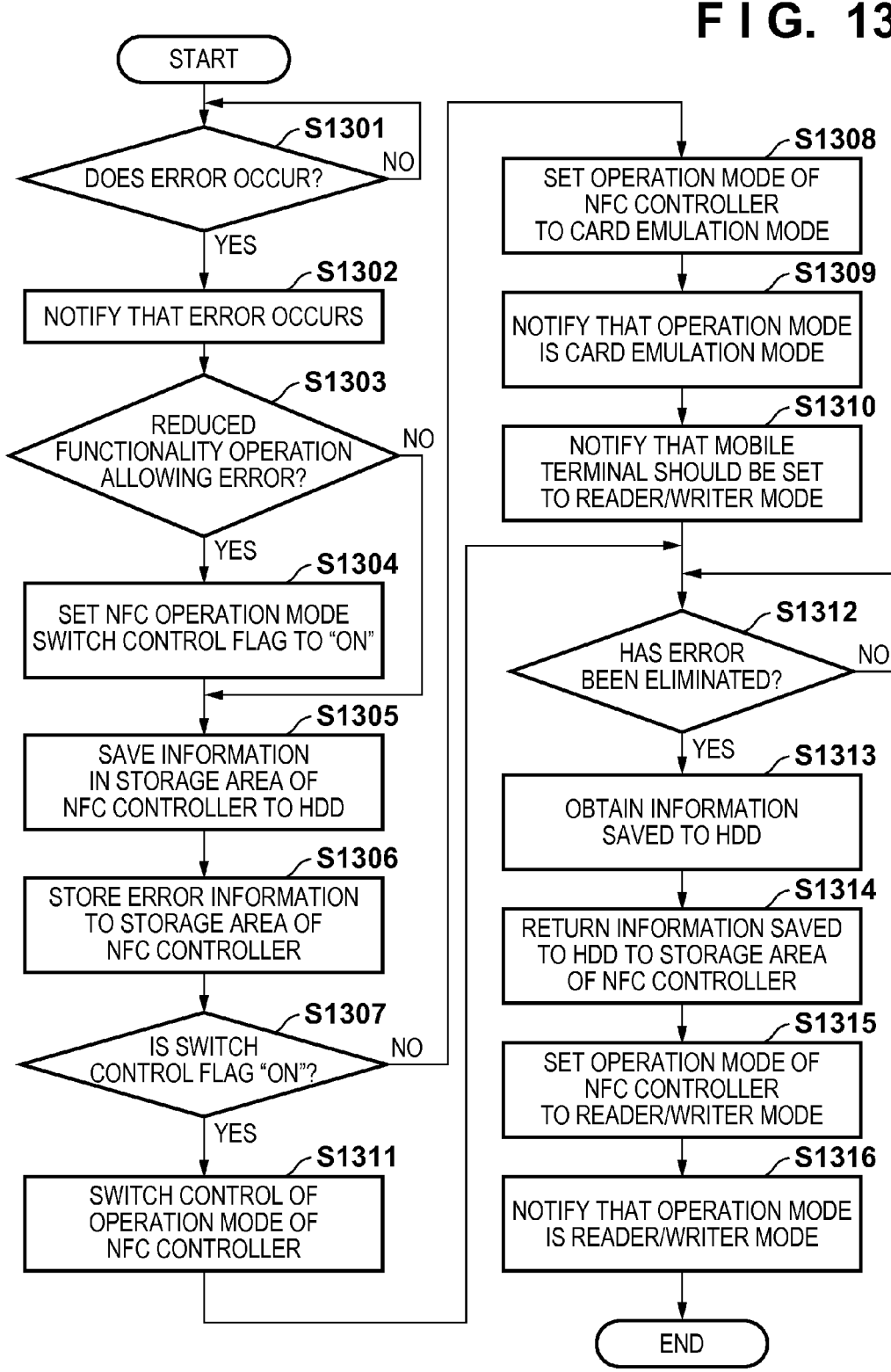
FIG. 13 is a flowchart showing steps of a process which is performed by an image forming apparatus 100 when an error occurs, according to a third embodiment.
Figure 14:
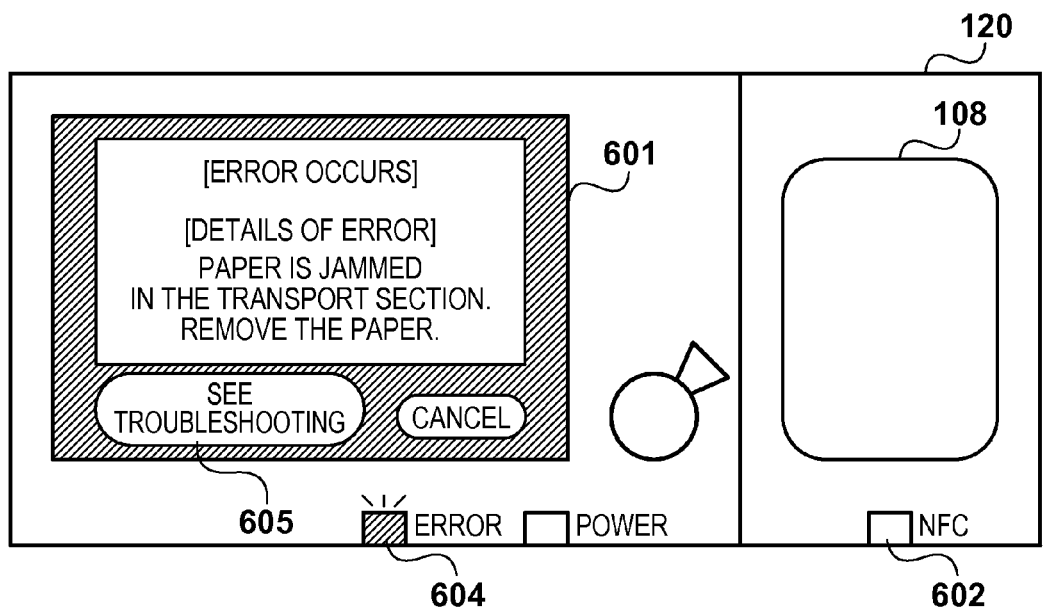
FIG. 14 is a diagram showing an example display on an operation unit 107 when information is set into an NFC controller 107 of an image forming apparatus 100, according to the third embodiment.

FIG. 13 is a flowchart showing steps of a process which is performed by the image forming apparatus 100 according to this embodiment when an error occurs. The process of FIG. 13 is achieved in the image forming apparatus 100 by the CPU 101 reading a program stored in the ROM 103 to the RAM 102 and executing the program.

When the image forming apparatus 100 is in the normal operation state, in step S1301 the CPU 101 monitors the status of the image forming apparatus 100 to determine whether or not an error occurs. The CPU 101, when determining that an error does not occur ("NO" in step S1301), monitors the status of the image forming apparatus 100 by repeating the determination process. In this case, the image forming apparatus 100 is in the normal operation state, and the copy function, the print function, etc. can be used. On the other hand, the CPU 101, when determining that an error occurs ("YES" in step S1301), causes the process to proceed to step S1302. In step S1302, as shown in FIG. 14, the CPU 101 turns on an error notification LED 604 of an operation unit 120, and causes a display unit 601 to display a message indicating that an error occurs. As a result, the CPU 101 notifies the user that an error occurs in the image forming apparatus 100. Here, when the user presses down a button 705, the CPU 101 may cause the display unit 601 to display instructions for troubleshooting the error.

Next, in step S1303, the CPU 101 determines whether or not an error occurring in the image forming apparatus 100 is a reduced functionality operation allowing error. Here, the reduced functionality operation allowing error means an error which does not cause the image forming apparatus 100 to be unable to use all functions thereof, i.e., the image forming apparatus 100 can operate using only a portion of the functions with a function(s) involved in the error being stopped. When such an error occurs, the image forming apparatus 100 can continue to operate using limited executable functions. An example of such an operation is as follows. For example, when an error occurs in the scanner unit 130, the image forming apparatus 100 stops the operation of the scanner unit 130, and receives only an input of a print job to perform printing using the printer unit 140.

In step S1303, the CPU 101, when determining that an error occurring in the image forming apparatus 100 is a reduced functionality operation allowing error ("YES" in step S1303), causes the process to proceed to step S1304. In step S1304, the CPU 101 sets a switch control flag stored in the RAM 102 etc. to "on," and causes the process to proceed to step S1305. On the other hand, the CPU 101, when determining in step S1303 that an error occurring in the image forming apparatus 100 is not a reduced functionality operation allowing error ("NO" in step S1303), causes the process to directly proceed to step S1305.

Steps S1305 and S1306 are similar to steps S903 and S904 (FIG. 9). Next, in step S1307, the CPU 101 determines whether or not the switch control flag is "on." The CPU 101, when the flag is "on" ("YES" in step S1307), causes the process to proceed to step S1311, and when the flag is "off" ("NO" in step S1307), causes the process to proceed to step S1308.

In step S1311, the operation mode of the NFC controller 107 is set to the card emulation mode (step S1308). This is because, when the image forming apparatus 100 cannot perform a reduced functionality operation, the image forming apparatus 100 can perform no functions, and therefore, it is not necessary to allow the user to use the authentication function. Therefore, in steps S1308 to S1310, a process similar to that of the first embodiment (steps S905 to S907 of FIG. 9) is performed to cause the NFC controller 107 to operate in the card emulation mode. Thereafter, the CPU 101 causes the process to proceed to step S1312.

On the other hand, in step S1308, the CPU 101 performs a process similar to that of the second embodiment (step S1205 of FIG. 12). Specifically, the CPU 101 performs an operation mode switch control to operate the NFC controller 107 while alternating the reader/writer mode and the card emulation mode at predetermined time intervals. Thereafter, the CPU 101 causes the process to proceed to step S1312.

Steps S1312 to S1316 are similar to steps S909 to S912 and therefore will not be described.

Thus, in this embodiment, when an error occurring in the image forming apparatus 100 is a reduced functionality operation allowing error, the NFC controller 107 is controlled to alternate the reader/writer mode and the card emulation mode. As a result, the user who wishes to use the image forming apparatus 100 can use the authentication function by putting an authentication card on or near the antenna 108 of the image forming apparatus 100, and the mobile terminal 300 can display error information of the image forming apparatus 100. Therefore, notification of error information can be performed on the mobile terminal 300 via NFC without impairing the convenience of the user who uses the image forming apparatus 100 via the authentication function. Also, in this embodiment, only when the image forming apparatus 100 cannot perform a reduced functionality operation, the operation mode is fixed to the card emulation as in the first embodiment. As a result, even when the user turns the image forming apparatus 100 off if an error occurs, the mobile terminal 300 can read error information from the image forming apparatus 100.

Although, in this embodiment, an error occurring in the scanner unit 130 has been described as an example reduced functionality operation allowing error, other errors may occur. For example, an error may occur in a stapler (not shown) which is included in the image forming apparatus 100 to hold sheets printed by the image forming apparatus 100 together. The image forming apparatus 100 can perform an operation to output printed sheets without performing a staple operation when an error occurs in the stapler.

On the other hand, examples of an error which causes the image forming apparatus 100 not to operate a reduced functionality operation, include errors occurring in the operation unit 120, the device I/F 111, etc. For example, when an error occurs in the operation unit 120, the image forming apparatus 100 cannot be operated by the user using the operation unit 120. Therefore, it is not necessary for the image forming apparatus 100 to allow the user to use the authentication function. When an error occurs in the device I/F 111, image data cannot be input or output to or from the scanner unit 130 or the printer unit 140. Therefore, similar to when an error occurs in the operation unit 120, it is not necessary for the image forming apparatus 100 to allow the user to use the authentication function. Therefore, in such cases, the user's convenience is not impaired, even if the operation mode of the NFC controller 107 is switched to the card emulation mode.

Fourth Embodiment

Next, a fourth embodiment of the present invention will be described. In the above first to third embodiments, when the image forming apparatus 100 is in the normal operation state, the operation mode of the NFC controller 107 is switched in accordance with a user's instruction. In the normal operation state, alternatively, the operation mode of the NFC controller 107 may be controlled to alternate between the reader/writer mode and the card emulation mode at predetermined time intervals as in step S1205 of FIG. 12. In this embodiment, the CPU 101, when the image forming apparatus 100 is in the normal operation state, performs such a switch control on the operation mode of the NFC controller 107.

Note that, during such a switch control, if the NFC controller 107 has been set to the reader/writer mode, then when the image forming apparatus 100 is turned off, information stored in the NFC controller 107 cannot be read by the mobile terminal 300. Therefore, in this embodiment, the CPU 101, when an error occurs during the normal operation state, interrupts such a switch control, and fixedly sets the operation mode of the NFC controller 107 to the card emulation mode. Thereafter, when the error has been eliminated, the operation mode switch control is resumed.

According to this embodiment, the user is no longer required to perform an operation to switch the operation mode of the NFC controller 107. As a result, the authentication function can be used in the reader/writer mode, and the mobile terminal 300 is allowed to read and display information in the card emulation mode, without a decrease in the user's convenience. Also, in this embodiment, as in the first and third embodiments, even when the image forming apparatus 100 is off, the mobile terminal 300 is allowed to read information, such as error information etc., from the image forming apparatus 100 via NFC communication.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-102595, filed May 14, 2013, which is hereby incorporated by reference herein in its entirety.

What is claimed is:

1. A communication apparatus comprising:
  a wireless communication unit configured to have a storage area for storing information and to perform short-range wireless communication, wherein when a predetermined error does not occur in the communication apparatus, a reader/writer mode is set as an operation mode of the wireless communication unit;
  a detection unit configured to detect that the predetermined error occurs in the communication apparatus; and a control unit configured to, when the detection unit detects that the predetermined error occurs in the communication apparatus, store error information corresponding to the predetermined error in the storage area and change the operation mode of the wireless communication unit from the reader/writer mode to a card emulation mode, wherein the reader/writer mode is an operation mode for the wireless communication unit to read information from an external apparatus, and the card emulation mode is an operation mode for allowing an external apparatus to read information stored in the storage area.

2. The communication apparatus according to claim 1, wherein when the predetermined error occurring in the communication apparatus has been eliminated, the control unit sets the operation mode of the wireless communication unit from the card emulation mode back to the reader/writer mode.

3. The communication apparatus according to claim 1, wherein the communication apparatus is an image forming apparatus that can execute printing.

4. The communication apparatus according to claim 1, wherein the short-range wireless communication is wireless communication based on NFC.

5. A method for controlling a communication apparatus, comprising:

causing, when a predetermined error does not occur in the communication apparatus, a reader/writer mode to be set as an operation mode of a wireless communication unit arranged to perform short-range wireless communication, the wireless communication unit having a storage area for storing information;

detecting that the predetermined error occurs in the communication apparatus; and when the detecting detects that the predetermined error occurs in the communication apparatus, storing error information corresponding to the predetermined error in the storage area and changing the operation mode of the wireless communication unit from the reader/writer mode to a card emulation mode, wherein the reader/writer mode is an operation mode for the wireless communication unit to read information from an external apparatus, and the card emulation mode is an operation mode for allowing an external apparatus to read information stored in the storage area.

6. A non-transitory computer-readable storage medium storing a computer program for causing a computer to execute steps of a method for controlling a communication apparatus, the method comprising:

causing, when a predetermined error does not occur in the communication apparatus, a reader/writer mode to be set as an operation mode of a wireless communication unit arranged to perform short-range wireless communication, the wireless communication unit having a storage area for storing information;

detecting that the predetermined error occurs in the communication apparatus; and when the detecting detects that the predetermined error occurs in the communication apparatus, storing error information corresponding to the predetermined error in the storage area and changing the operation mode of the wireless communication unit from the reader/writer mode to a card emulation mode, wherein the reader/writer mode is an operation mode for the wireless communication unit to read information from an external apparatus, and the card emulation mode is an operation mode for allowing an external apparatus to read information stored in the storage area.

7. A communication apparatus comprising:

a wireless communication unit configured to have a storage area for storing information and to perform short-range wireless communication, wherein when a predetermined error does not occur in the communication apparatus, a reader/writer mode is set as an operation mode of the wireless communication unit;

a detection unit configured to detect that the predetermined error occurs in the communication apparatus; and a control unit configured to, when the detection unit detects that the predetermined error occurs in the communication apparatus, store error information corresponding to the predetermined error in the storage area and change the operation mode of the wireless communication unit from the reader/writer mode to a switching mode for alternating the reader/writer mode and the card emulation mode at predetermined time intervals, wherein the reader/writer mode is an operation mode for the wireless communication unit to read information from an external apparatus, and the card emulation mode is an operation mode for allowing an external apparatus to read information stored in the storage area.

8. The communication apparatus according to claim 7, wherein when the predetermined error occurring in the communication apparatus has been eliminated, the control unit sets the operation mode of the wireless communication unit from the switching mode back to the reader/writer mode.

9. The communication apparatus according to claim 7, wherein the communication apparatus is an image forming apparatus that can execute printing.

10. The communication apparatus according to claim 7, wherein the short-range wireless communication is wireless communication based on NFC.

11. A communication method for controlling a communication apparatus, comprising:

when a predetermined error does not occur in the communication apparatus, setting a reader/writer mode as an operation mode of a wireless communication unit configured to have a storage area for storing information and to perform short-range wireless communication;

detecting that the predetermined error occurs in the communication apparatus; and when the detecting detects that the predetermined error occurs in the communication apparatus, storing error information corresponding to the predetermined error in the storage area and changing the operation mode of the wireless communication unit from the reader/writer mode to a switching mode for alternating the reader/writer mode and the card emulation mode at predetermined time intervals, wherein the reader/writer mode is an operation mode for the wireless communication unit to read information from an external apparatus, and the card emulation mode is an operation mode for allowing an external apparatus to read information stored in the storage area.

12. A non-transitory computer-readable storage medium storing a computer program for causing a computer to execute steps of a method for controlling a communication apparatus, the method comprising:

when a predetermined error does not occur in the communication apparatus, setting a reader/writer mode as an operation mode of a wireless communication configured to have a storage area for storing information and to perform short-range wireless communication;

detecting that the predetermined error occurs in the communication apparatus; and when the detecting detects that the predetermined error occurs in the communication apparatus, storing error information corresponding to the predetermined error in the storage area and changing the operation mode of the wireless communication unit from the reader/writer mode to a switching for alternating the reader/writer mode and the card emulation mode at predetermined time intervals, wherein the reader/writer mode is an operation mode for the wireless communication unit to read information from an external apparatus, and the card emulation mode is an operation mode for allowing an external apparatus to read information stored in the storage area.

\* \* \* \* \*